Patented Sept. 29, 1931

1,824,807

UNITED STATES PATENT OFFICE

JOHN ENGLISH, OF GLASS WORKS, SMETHWICK, ENGLAND, ASSIGNOR TO CHANCE BROTHERS AND CO. LIMITED, OF GLASS WORKS, SMETHWICK, ENGLAND

REMOVAL OF IMPURITIES FROM SAND, CLAY, AND THE LIKE MATERIALS

No Drawing. Application filed December 13, 1929, Serial No. 413,948, and in Great Britain February 12, 1929.

For the manufacture of the higher grades of glass, such as those required for table ware or optical purposes, it is essential that the iron content of the sand used should be very low. Natural sand of the necessary degree of purity is scarce and relatively expensive, whereas sand containing larger amounts of iron is abundant and cheap. The object of the present invention is to render sands of the latter kind available for use for purposes to which at the present time only pure and expensive sands are applicable. My object also includes the treatment of clay and other like materials in a finely divided state for use in the manufacture of refractories, pottery or earthenware or for analogous purposes.

The invention comprises the subjecting of sand or other material, when heated to a temperature from 700° to 1000° C, to the action of a reducing gas such as hydrogen, carbon monoxide, or sulphur dioxide, and at the same time, or subsequently, to the action of chlorine, for removal of the iron.

In one manner of applying the invention to the treatment of sand, the sand is contained in a rotary kiln wherein it can be both heated and mechanically agitated or kept in a state of motion so that all parts can be subjected to the action of the purifying gas. Temperatures lying between 700 and 1000° C. are found to be suitable. While in the kiln the sand is subjected to the action of a reducing gas, such as hydrogen, carbon monoxide or sulphur dioxide. This converts the iron oxides present into a condition in which they are capable of being acted upon and removed by chlorine. subsequently chlorine is passed through the kiln, and by this agency the iron is removed either completely or to a sufficient extent to enable the sand to be used for purposes in which it is necessary that the iron content should be very low. If desired, the chlorine and the reducing gas may be admitted together so that the reducing and chlorination of the iron may proceed simultaneously. In this case it is not practicable to employ hydrogen as the reducing gas, as it forms an explosive mixture with chlorine. After passing through the kiln the gas is suitably treated for the removal of iron chloride, and as a large quantity of gas remains unaffected, the gas is returned to the kiln for further use.

As an example of results obtained by this invention, a natural sand containing 0.11% of iron calculated as $Fe_2O_3$ had its iron content reduced to 0.009% $Fe_2O_3$. In another example, a high grade sand which originally had an iron content of 0.008% $Fe_2O_3$ contained 0.0025% $Fe_2O_3$ after treatment by my invention.

By means of my invention I can also reduce slightly the titanium content of sands, but its main object, as already stated, is that of removing iron, and so in an economic manner rendering available for use in the manufacture of high grade glass sands which are not otherwise suitable.

The invention is not limited to any particular method or means of carrying it into effect, as such details can be varied to meet different requirements. The application of the invention to clays and other substances is essentially the same as that above described.

Having thus described my invention what I claim as new and desire to secure by Letters Patent is:—

1. Method for the removal of iron from sand, clay and like materials which consists in heating the materials to a temperature of from 700° to 1000° C., and while so heated subjecting the materials to the action of a reducing gas and chlorine, the chloride formed being afterwards removed from the gas.

2. Method for the removal of iron from sand, clay and like materials, which consists in heating the materials to a temperature of from 700° to 1000° C., subjecting the materials while so heated to the action of a reducing gas and chlorine, subsequently removing from the gas the chloride formed and finally returning the gas for further action.

3. Method for the removal of iron from sand, clay and like materials, which consists in heating the materials to a temperature of from 700° to 1000° C. in a rotary kiln in which the materials are also agitated, subjecting the heated and agitated materials to the action of a reducing gas and chlorine, treating the mixed gases withdrawn from the kiln for the removal of chloride, and finally returning the gases to the kiln.

In testimony whereof I have signed my name to this specification.

JOHN ENGLISH.